US012201220B2

(12) United States Patent
Reyes et al.

(10) Patent No.: US 12,201,220 B2
(45) Date of Patent: Jan. 21, 2025

(54) SAFETY LATCH MECHANISM

(71) Applicant: BEDJET LLC, Newport, RI (US)

(72) Inventors: Manuel Reyes, Newport, RI (US); Mark Darius Aramli, Newport, RI (US)

(73) Assignee: BEDJET LLC, Newport, RI (US)

( * ) Notice: Subject to any disclaimer, the term of this patent is extended or adjusted under 35 U.S.C. 154(b) by 447 days.

(21) Appl. No.: 17/188,758

(22) Filed: Mar. 1, 2021

(65) Prior Publication Data

US 2022/0273110 A1 Sep. 1, 2022

(51) Int. Cl.
*A47C 20/04* (2006.01)
*E05B 65/44* (2006.01)

(52) U.S. Cl.
CPC .............. *A47C 20/04* (2013.01); *E05B 65/44* (2013.01)

(58) Field of Classification Search
CPC ................................ A47C 20/04; E05B 65/44
USPC .............................................................. 5/618
See application file for complete search history.

(56) References Cited

U.S. PATENT DOCUMENTS 3,965,500 A * 6/1976 Stein, Jr. ................ A61G 7/015 5/618
4,100,630 A * 7/1978 Klose ................... A47C 20/047 5/617
4,227,269 A * 10/1980 Johnston ................ A61G 7/002 5/616
5,136,742 A * 8/1992 Stebbins .............. A47C 19/045 5/616
5,640,730 A * 6/1997 Godette ............... A47C 20/041 5/617
5,862,551 A * 1/1999 Oguma .................. A61G 7/015 403/231
6,363,556 B1 * 4/2002 Krauska ................. A61G 7/018 5/616
6,687,932 B1 * 2/2004 Bangert ............... A47C 20/041 5/617
6,880,189 B2 * 4/2005 Welling ............... G01G 19/445 5/624
7,328,055 B2 * 2/2008 Bonutti .................. A61B 5/704 5/624
7,739,762 B2 * 6/2010 Lamb ................... A61G 13/122 5/621
8,146,189 B2 * 4/2012 Yang ...................... A61G 13/02 5/616
8,615,827 B2 * 12/2013 Newkirk .............. A61G 7/0755 5/619
2002/0157185 A1 * 10/2002 Heimbrock .......... A61G 1/0212 5/618
2005/0120481 A1 * 6/2005 Farmont .............. A47C 20/041 5/613

(Continued)

*Primary Examiner* — Justin C Mikowski
*Assistant Examiner* — Luke Hall
(74) *Attorney, Agent, or Firm* — Robert J. Hess; Hess Patent Law Firm

(57) ABSTRACT

An articulating frame of an adjustable bedframe is restricted by a safety latch mechanism from pivoting beyond a limited range of motion from its undeployed position unless an actuator lifting assembly mechanism is driving the articulating frame to pivot. Locking tabs and guides mate with each other to restrain the actuator lifting assembly mechanism from moving beyond a limited range of motion unless the actuator lifting assembly mechanism is driving the articulating frame to pivot.

14 Claims, 12 Drawing Sheets

(56) References Cited

U.S. PATENT DOCUMENTS

2005/0125900 A1* 6/2005 Bishop ................. A61G 1/0212 5/618
2006/0031991 A1* 2/2006 McDaniel ............ A61G 7/0503 5/618
2006/0059621 A1* 3/2006 Poulos ................... A61G 7/012 5/430
2006/0059624 A1* 3/2006 Poulos ................... A61G 7/002 5/618
2007/0157385 A1* 7/2007 Lemire ................ A61G 7/0524 5/618
2007/0180621 A1* 8/2007 Turner ................... A61G 7/015 5/618
2007/0289063 A1* 12/2007 Martin ............... A61G 13/0018 5/618
2011/0138536 A1* 6/2011 Wernqvist ................ A61G 7/16 5/618
2012/0297544 A1* 11/2012 Griswold ............. A61G 7/1026 5/81.1 R
2013/0160210 A1* 6/2013 Zerhusen ................. A61G 7/16 5/618
2014/0033434 A1* 2/2014 Jackson ............. A61G 13/0054 5/607
2014/0109316 A1* 4/2014 Jackson ................. A61G 13/04 5/607
2014/0189954 A1* 7/2014 Lee ........................ A61G 7/005 5/618
2014/0310875 A1* 10/2014 Iida ...................... A61G 10/005 5/606
2016/0058639 A1* 3/2016 Lacasse ................. A61G 7/018 5/618
2017/0347795 A1* 12/2017 Knake .................. A47B 96/025
2019/0142671 A1* 5/2019 Poulos ..................... A61G 5/14 5/613
2021/0015266 A1* 1/2021 Kelly ................... A47C 20/025

* cited by examiner

FIG. 29B

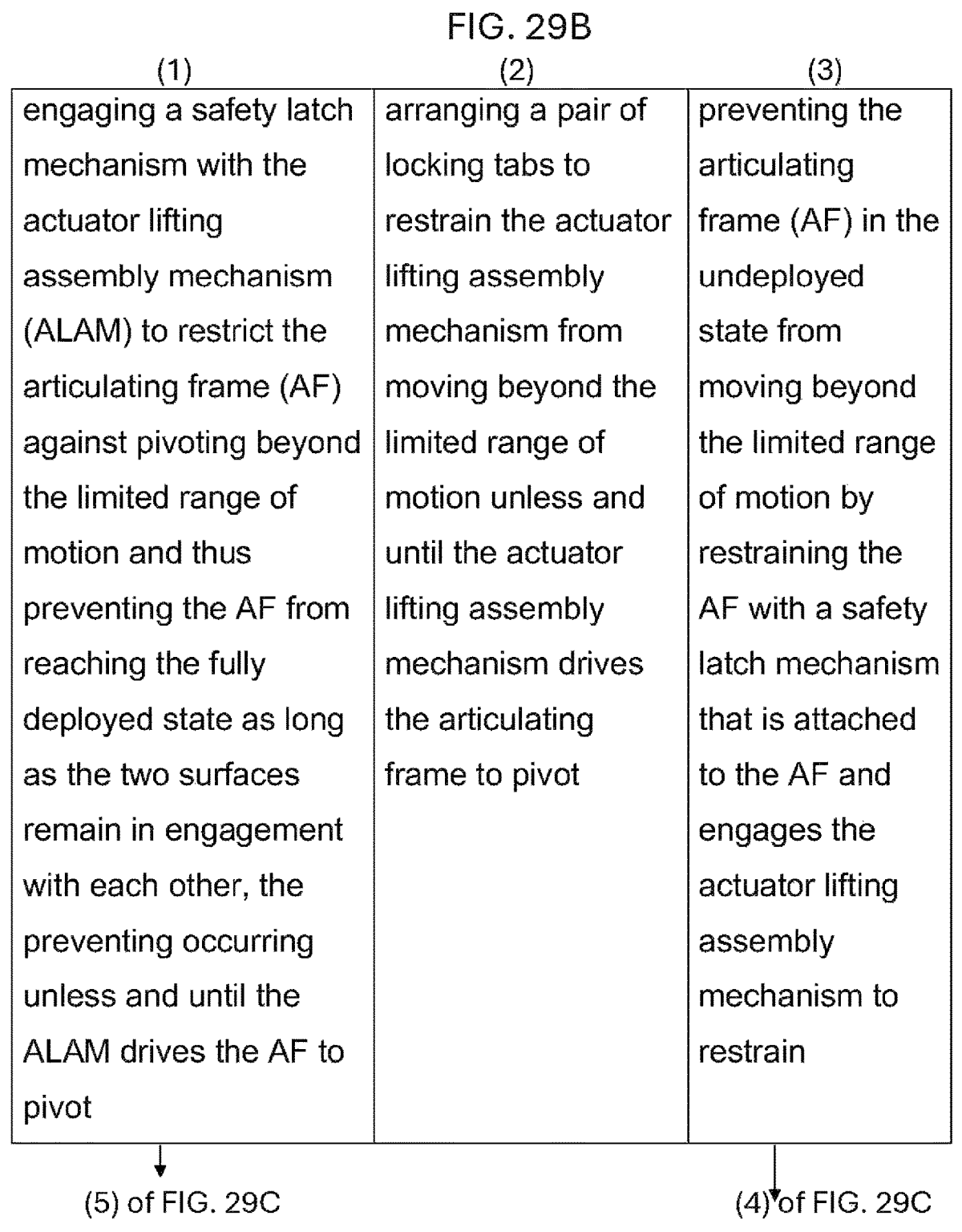

| (1) | (2) | (3) |
|---|---|---|
| engaging a safety latch mechanism with the actuator lifting assembly mechanism (ALAM) to restrict the articulating frame (AF) against pivoting beyond the limited range of motion and thus preventing the AF from reaching the fully deployed state as long as the two surfaces remain in engagement with each other, the preventing occurring unless and until the ALAM drives the AF to pivot | arranging a pair of locking tabs to restrain the actuator lifting assembly mechanism from moving beyond the limited range of motion unless and until the actuator lifting assembly mechanism drives the articulating frame to pivot | preventing the articulating frame (AF) in the undeployed state from moving beyond the limited range of motion by restraining the AF with a safety latch mechanism that is attached to the AF and engages the actuator lifting assembly mechanism to restrain |

(5) of FIG. 29C (4) of FIG. 29C

FIG. 29C (4)

Figure 29C:
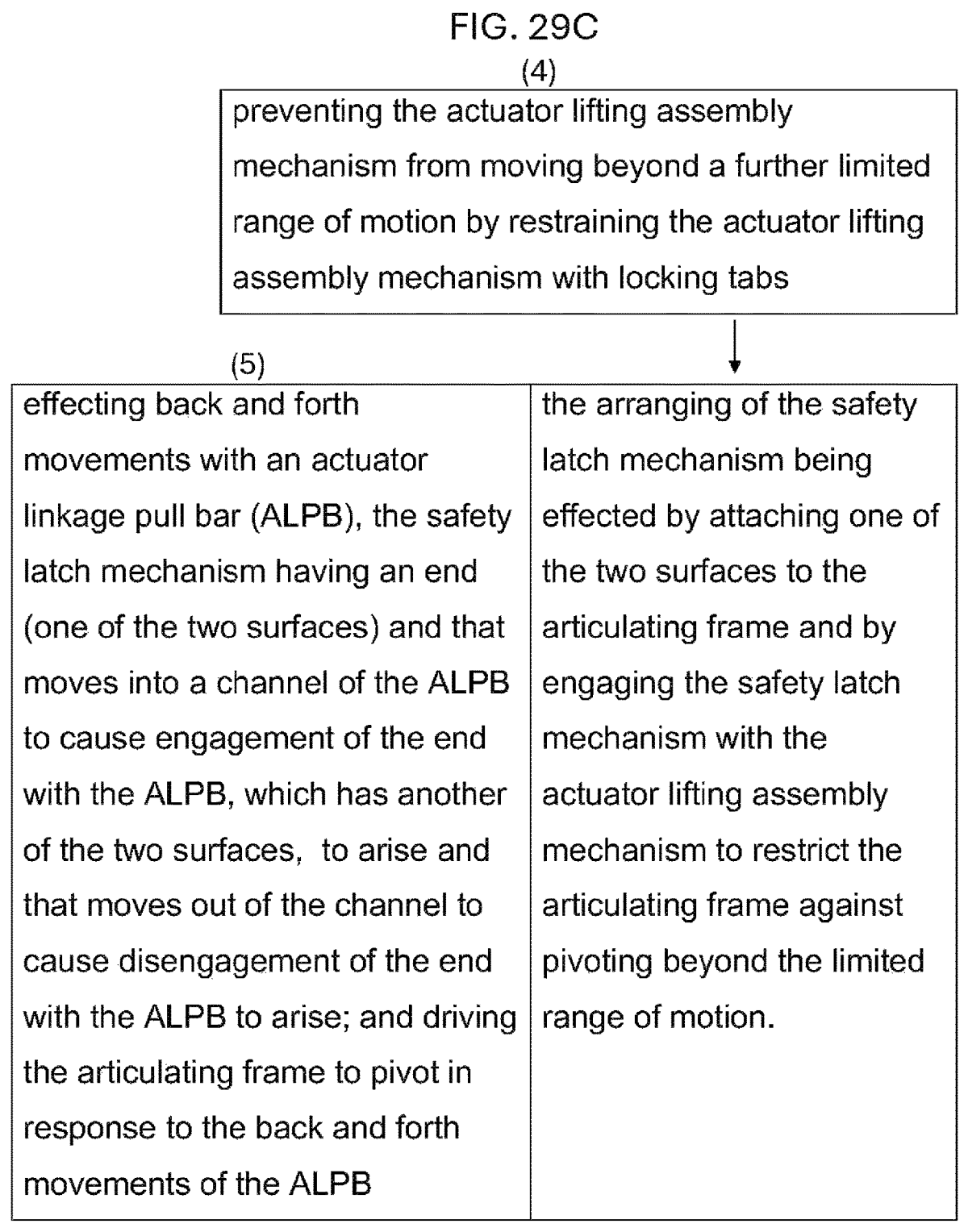

preventing the actuator lifting assembly mechanism from moving beyond a further limited range of motion by restraining the actuator lifting assembly mechanism with locking tabs

↓

(5)

| | |
|---|---|
| effecting back and forth movements with an actuator linkage pull bar (ALPB), the safety latch mechanism having an end (one of the two surfaces) and that moves into a channel of the ALPB to cause engagement of the end with the ALPB, which has another of the two surfaces, to arise and that moves out of the channel to cause disengagement of the end with the ALPB to arise; and driving the articulating frame to pivot in response to the back and forth movements of the ALPB | the arranging of the safety latch mechanism being effected by attaching one of the two surfaces to the articulating frame and by engaging the safety latch mechanism with the actuator lifting assembly mechanism to restrict the articulating frame against pivoting beyond the limited range of motion. |

SAFETY LATCH MECHANISM

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

1. Field of the Invention

The invention relates to mechanisms that prevent articulated portions of a bedframe from unexpectedly popping open and that vertically restrain actuator lifting assembly mechanisms that act on the articulated portions to cause them to pivot between undeployed and deployed states.

2. Description of Information Known to the Inventor, Including References to Specific Documents Related to the Invention, and Specific Problems Involved in the State of Technology that the Invention is Drawn Toward A bedframe may be equipped with an adjustable lifting assembly mechanism, such as that exemplified by an adjustable power bed layer of U.S. Pat. No. 10,463,163 B1, whose contents are incorporated herein by reference, or by an adjustable bed lift mechanism of U.S. Pat. No. 10,376,074 B2, whose contents are incorporated herein by reference. Both kinds of mechanisms have a stationary frame and two articulating frames. The two articulating frames pivot relative to the stationary frame from a horizontal orientation (undeployed state) to a respective angled, lifted orientation (deployed state). There are two articulating frames (located at the head-side of the bedframe and at the foot-side of the bedframe) because one is arranged to lift the head-side of a mattress and the other is arranged to lift the foot-side of the mattress.

Such a bedframe, due to its very thin profile and foldability, can exhibit unexpected behavior in handling, when unpacking or moving, for those consumers who haven't bothered to read the instructions concerning proper handling. That is, when handling the folded bedframe for moving, the head-side or foot-side can unexpectedly pop open if the bedframe is picked up incorrectly and oriented incorrectly, because the head-side and foot-side articulation of the bedframe are not vertically restrained (they are allowed to drop by gravity during powered articulation). This can be startling and unexpected for consumers, as well as annoying.

It is desired to make the consumer experience as frictionless as possible—that is, the consumer experience should enable assembly of the bedframe with little difficulty, i.e., preferably effecting assembly effortlessly without any appreciable, undesired incident. Therefore, there is a need to, in effect, lock the articulating portions down when the articulating portions are in an undeployed state, i.e., in a fully flat position. Also, there is a need to, in effect, vertically restrain the actuator lifting assembly mechanism while the articulating portions are in their undeployed state.

SUMMARY OF THE INVENTION

One aspect of the invention resides in a safety latch mechanism that locks the articulating frames of an adjustable bedframe in a flat or nearly flat position so that articulating frames won't unexpectedly open during moving/handling/repair of the bedframe. Such is operative when the articulating frames are to pivot from their undeployed state unless an actuator lifting assembly mechanism is driving the articulating frames to pivot.

A further aspect of the invention resides in providing vertical restraint for the actuator lifting assembly mechanism. Such is operative when the articulating frames are in their undeployed state unless the actuator lifting assembly mechanism is driving the articulating frames to pivot.

BRIEF DESCRIPTION OF THE DRAWING

For a better understanding of the present invention, reference is made to the following description and accompanying drawings, while the scope of the invention is set forth in the appended claims.

FIGS. 2-4 are skipped. The safety latch mechanism catches onto the top of the wall bounding the cavity and thus remains within the cavity instead of emerging from it as in FIGS. 2-4.

FIGS. 6-7 omit showing the safety latch mechanism of FIGS. 1-5.

FIG. 28 is a schematic representation of the assembly and FIGS. 29A, 29B and 29C depict a schematic diagram of a method of limiting a range of motion of the actuator lifting assembly mechanism or the adjustable frames of an adjustable bedframe according to the invention.

DETAILED DESCRIPTION OF THE INVENTION

Figure 1:
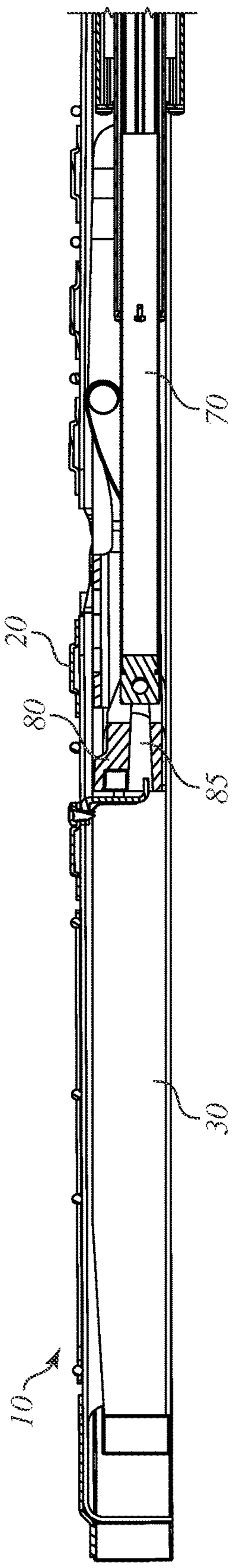
FIGS. 1-4 are sectional side views in succession of a foot-side adjustable mechanism for a bed frame in accordance with the invention and that is equipped with a safety latch mechanism shown emerging from a cavity of a pull bar of the foot-side adjustable mechanism as the cavity is pulled away from the safety latch mechanism.
Figure 2:
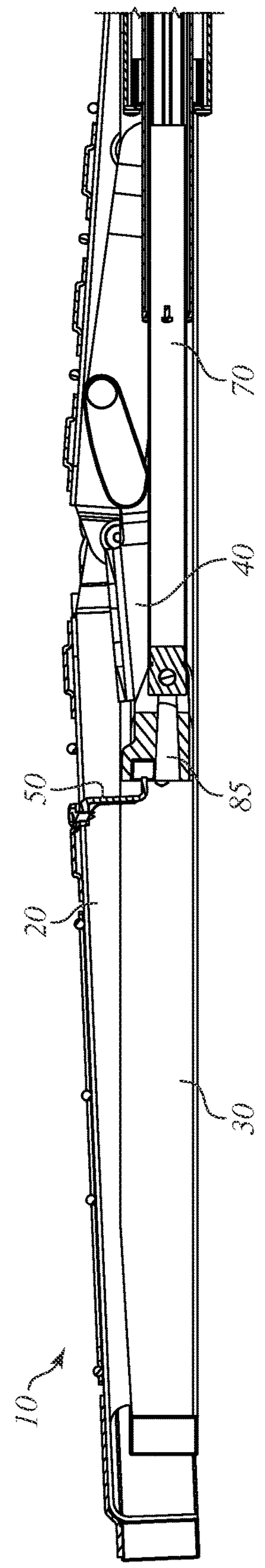
Figure 3:
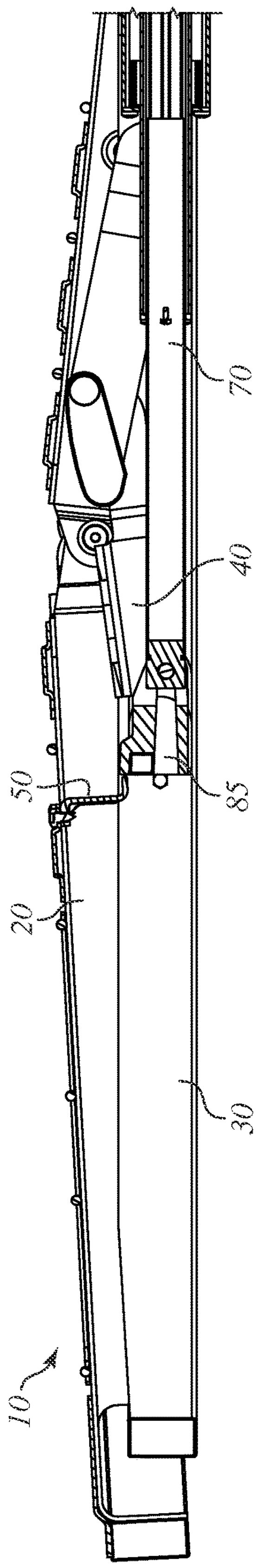
Figure 4:
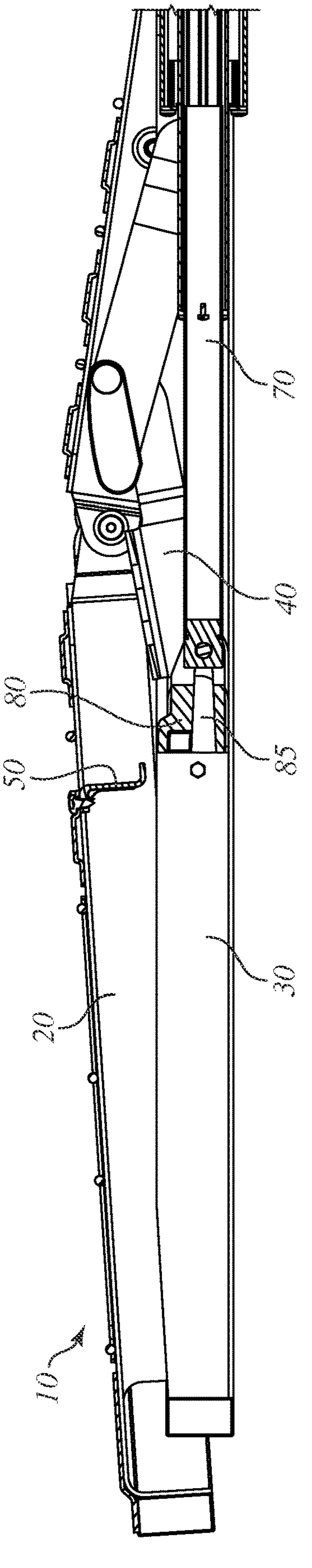

Turning to the drawings, FIGS. 1-7 show an adjustable bedframe 10 having an articulating frame 20 and a stationary frame 30. An actuator lifting assembly mechanism 40 is configured to drive the articulating frame 20 to pivot as the stationary frame 30 remains stationary. FIGS. 1-4 show the manner in which safety latch mechanism 50 leaves a channel 85 of an actuator linkage pull bar 80 in response to the articulating frame 20 being driven to pivot from an undeployed state into a deployed state.

The safety latch mechanism 50 is attached to the articulating frame 20. As can be appreciated from FIGS. 1 and 5, an engagement arises between the safety latch mechanism 50 and the upper wall of the channel 85 in the event that the articulating frame 20 pivots from its undeployed state relative to the stationary frame 30 without being driven by the actuator lifting assembly mechanism 40. Such an engagement has the effect of limiting the range of motion that the articulating frame 20 can travel. The actuator lifting assembly mechanism 40 may be constructed in the same manner as that provided for the adjustable power bed layer of U.S. Pat. No. 10,463,163 B1 or for the adjustable bed lift mechanism of U.S. Pat. No. 10,376,074 B2.

As a consequence, the safety latch mechanism 50 is thus arranged to effect restriction of the articulating frame 20 from pivoting out of the undeployed state beyond the limited range of motion unless the actuator lifting assembly mechanism 40 is driving the articulating frame 20 to pivot. Thus, the articulating frame 20 is precluded from pivoting out of its undeployed state because of the presence of gravitational forces that might otherwise cause the articulating frame 20 to pivot.

FIGS. 1-5 show a safety latch mechanism 50 is configured to become "latched" by pressing against an upper inside surface of the channel 85 of the actuator linkage pull bar 80 so as to allow the articulating frame 20 to have only a very small range of motion. When "unlatched", the safety latch mechanism 50 clears the channel 85 and no longer prevents the articulating frame 20 from pivoting to its fully angled position (deployed state) relative to the stationary frame 30 and in so doing to lift up a foot-side of a mattress (not shown) located above.

As the actuator linkage pull bar 80 engages the actuator lifting assembly mechanism 40 over an initial short distance (i.e., a "latch engagement range") to raise or lift the articulating frame 20, the articulating frame 20 moves upward slightly within the very small range of motion that is allowed when latched. At the same time, the push/pull rod 70 of the actuator is pulling the channel 85 away from the safety latch mechanism 50 until they are fully separated while still within the "latch engagement range", thus allowing the safety latch mechanism 50 and the channel 85 of the actuator linkage pull bar 80 to clear each other freely as the articulating frame 20 continues to rise.

Figure 5:
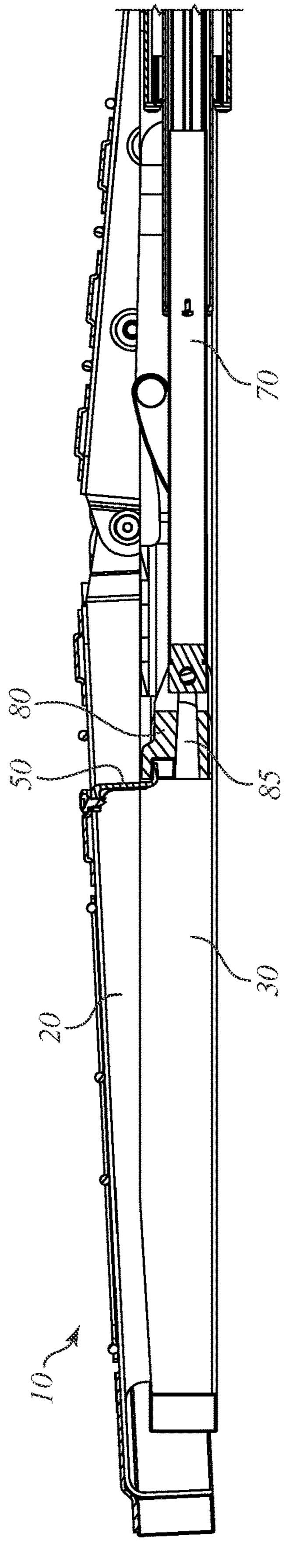
FIG. 5 is a sectional side view that shows the result in succession to that of FIG. 1 if

The channel 85 is configured to accommodate a bent end of the latch of the safety latch mechanism 50. FIGS. 1-4 illustrate the manner that the safety latch mechanism 50 leaves its latched position to enter into its unlatched position, i.e., by becoming separated from the channel 85. However, if the articulating frame 20 is raised with the safety latch mechanism 50 in its relative position of FIG. 1, then the safety latch mechanism 50 in effect limits the range of motion that the articulating portion can travel because of its engagement as shown in FIG. 5 as it presses against an upper peripheral surface that bounds the channel 85.

In one embodiment, the actuator lifting assembly mechanism 40 is unrestrained in the vertical direction and so could lift up under manual force even with the safety latch mechanism 50 of the present invention present. Thus, a vertical restraint should be imposed. That is, the safety latch mechanism 50 may be effectively restraining the articulating frame 20 from pivoting beyond the limited range of motion, but that does not mean that the actuator lifting assembly mechanism 40 is likewise so restricted in its range of motion.

Figure 6:
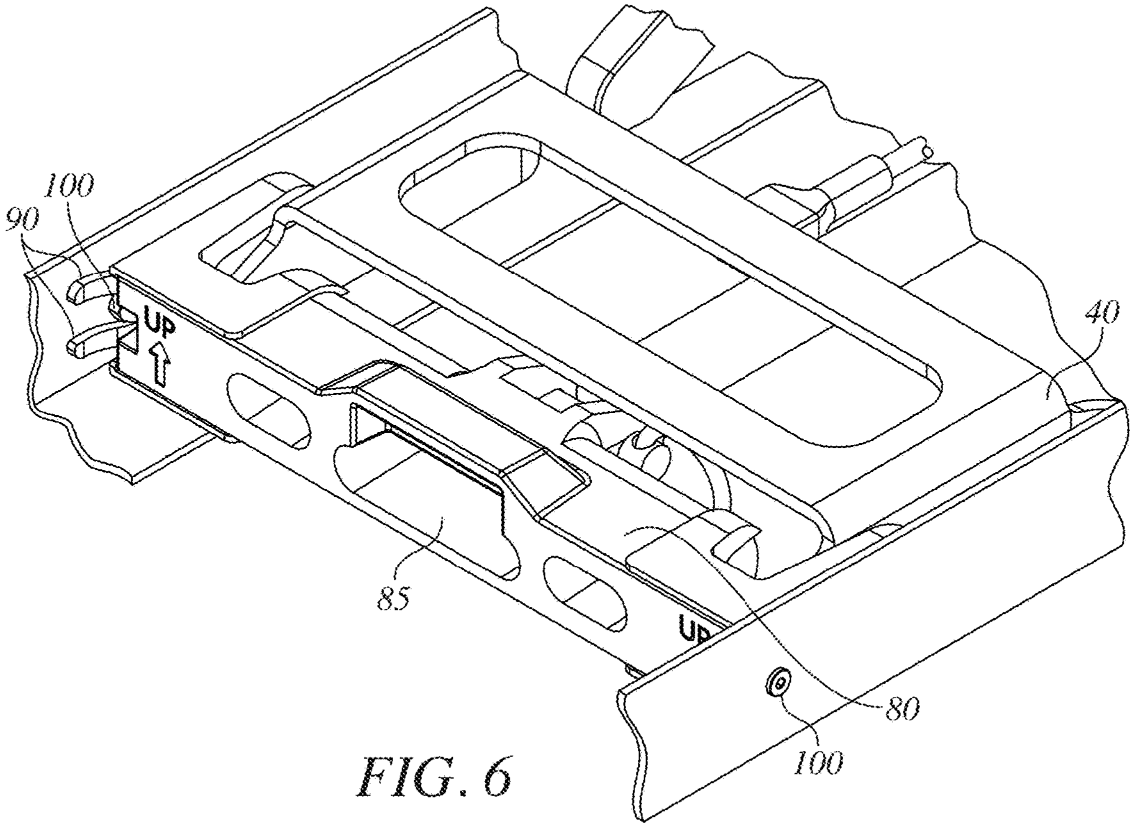
FIGS. 6-7 are successive isometric views showing the actuator lifting assembly mechanism of FIG. 1 being guided into engagement with tabs.
Figure 7:
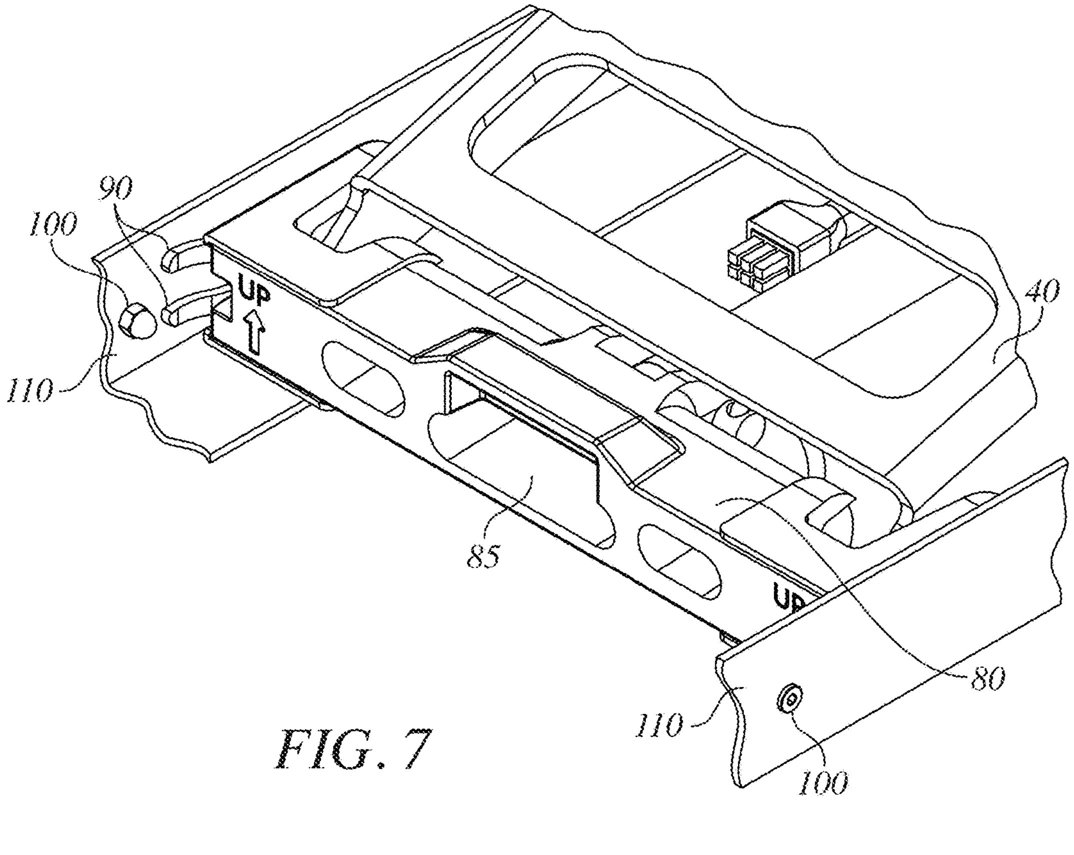
Figure 8:
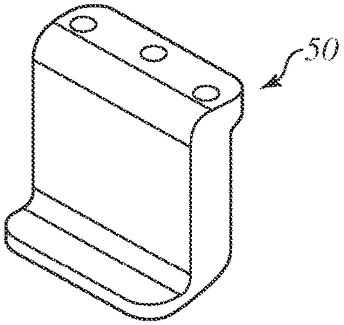
FIG. 8 is an isometric view of the top, rear and right side of the safety latch mechanism of FIGS. 1-5.
Figure 9:
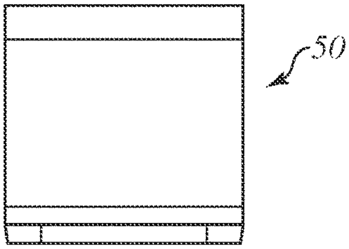
FIGS. 9-11 are respectively rear, bottom, and right-side views of the safety latch mechanism of FIG. 8, but with the right-side view shown rotated relative to the orientation of the right-side in FIG. 8. The left-side view is symmetric to the right-side view.
Figure 10:
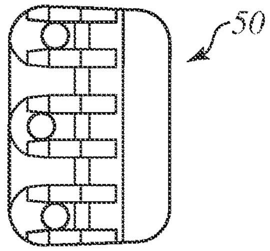
Figure 11:
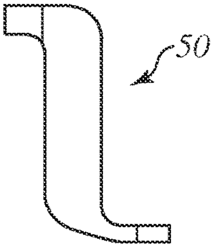
Figure 12:
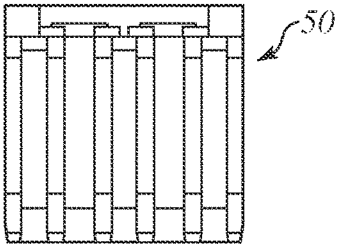
FIG. 12 is a front view of the safety latch mechanism of FIG. 8.
Figure 13:
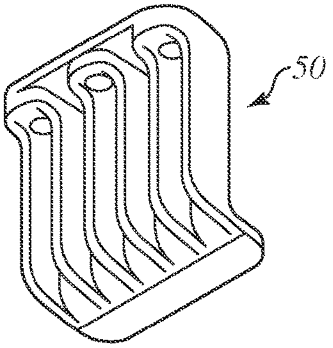
FIG. 13 is an isometric view in cross-section of the top, front and left side view of the safety latch mechanism of FIG. 8 and that is rotated relative to the orientation of FIG. 8.
Figure 14:
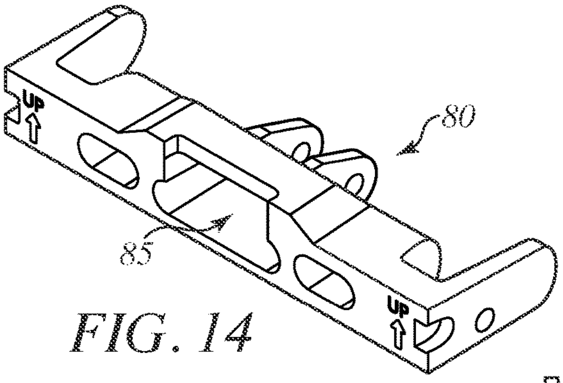
FIG. 14 is an isometric view of the top, front and right-side of the pull bar of the actuator lifting assembly mechanism in accordance with the invention.
Figure 15:
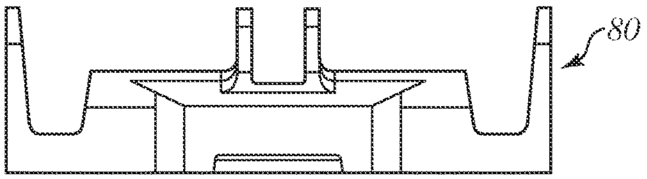
FIGS. 15-17 are respectively bottom, rear and right-side views of the pull bar of FIG. 14. The right-side view is symmetric to the left-side view.
Figure 17:
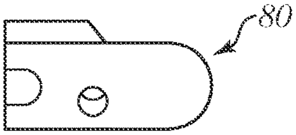
Figure 16:
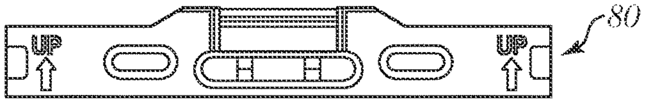
Figure 18:
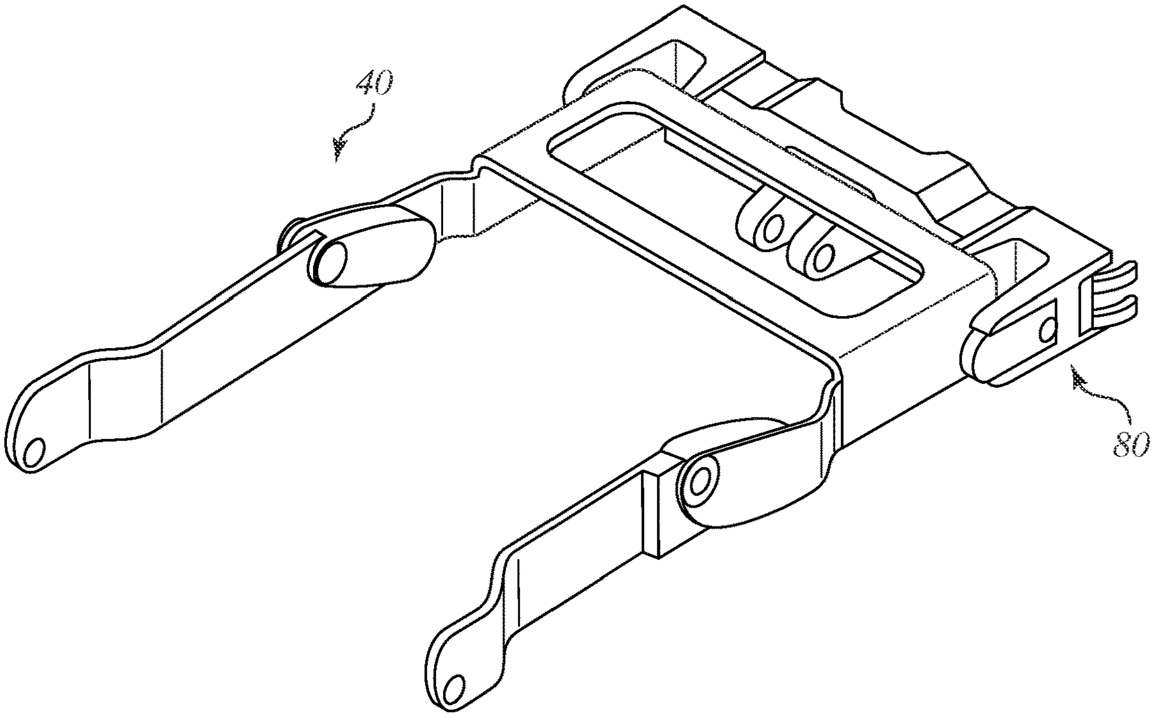
FIG. 18 is an isometric view of the top, front and right-side of the foot-side linkage of the actuator lifting assembly mechanism in accordance with the invention.
Figure 19:
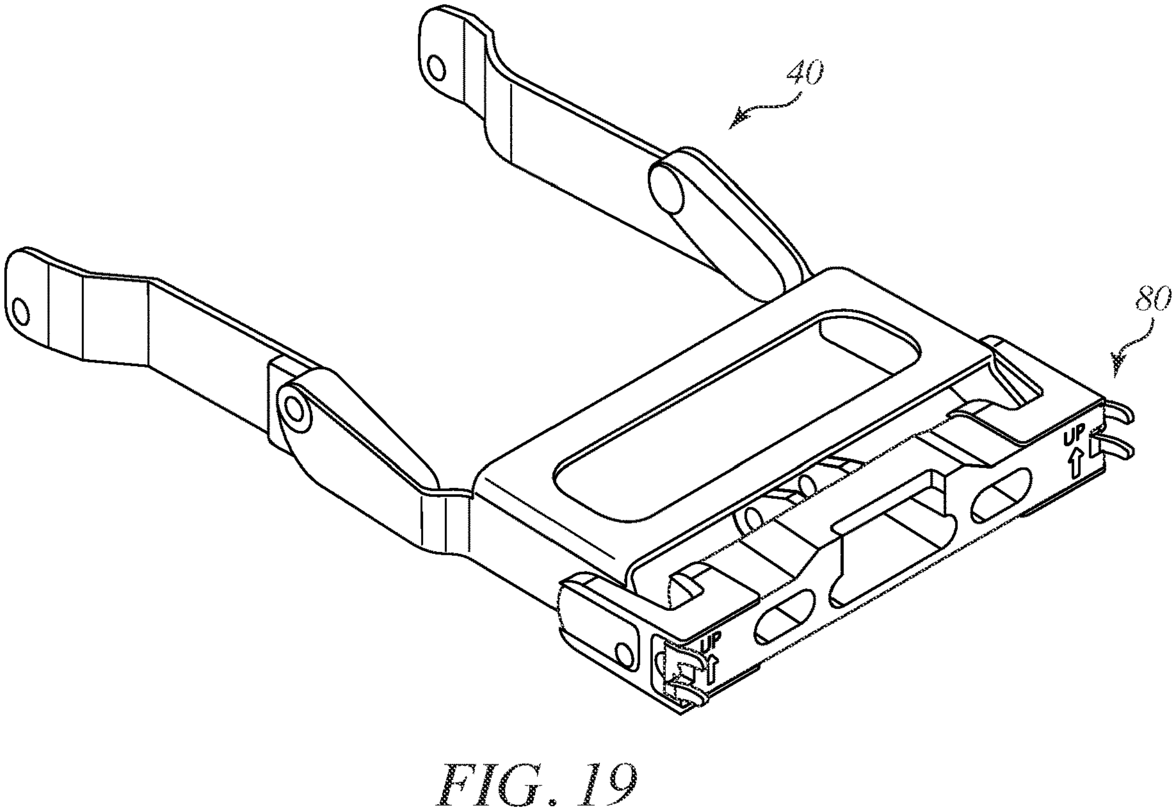
FIG. 19 is an isometric view of the top, rear and right-side view of the foot-side linkage of the actuator lifting assembly mechanism of FIG. 18 albeit rotated.
Figure 20:
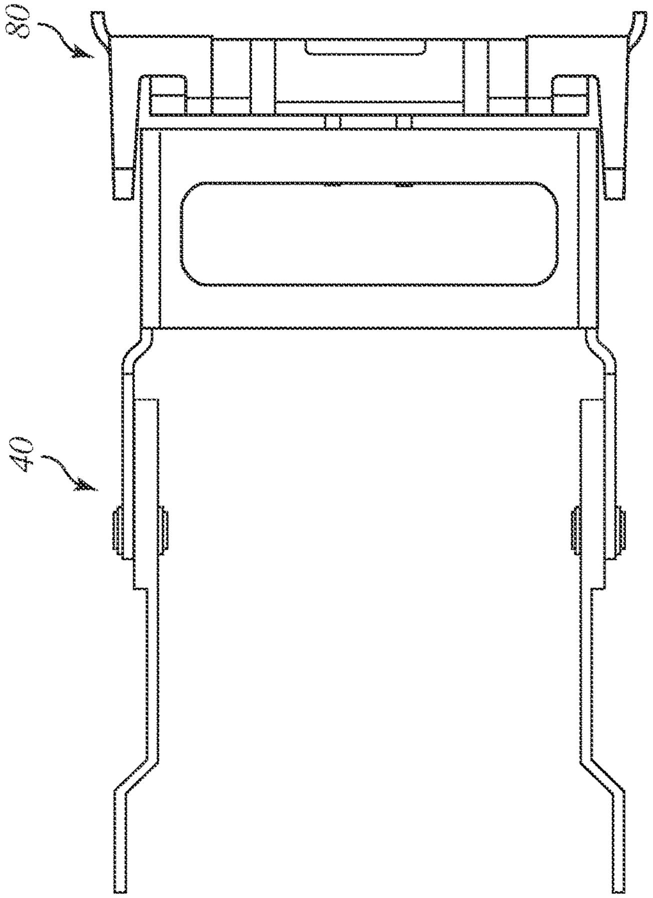
FIGS. 20-22 are respectively bottom, rear and right-side views of the foot-side linkage of the actuator lifting assembly mechanism of FIGS. 18 and 19. The right-side view is symmetric to the left-side view.
Figure 22:
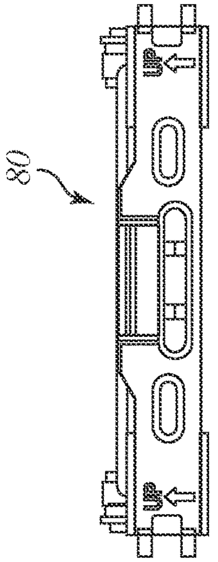
Figure 21:
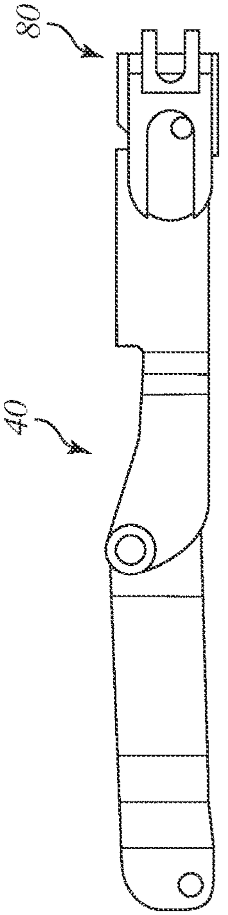
Figure 23:
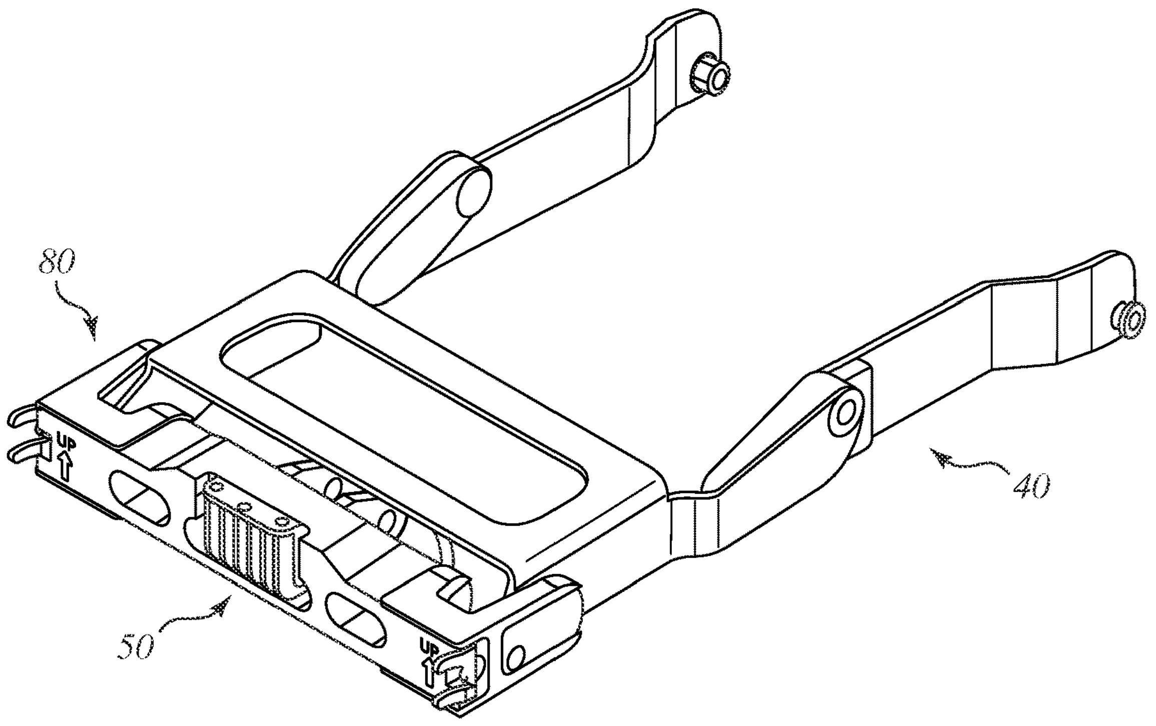
FIG. 23 is an isometric view of the top, front and right-side of the foot-side linkage and of the actuator lifting assembly mechanism of FIGS. 18-22 and with the safety latch mechanism of FIGS. 8-13 in place.
Figure 24:
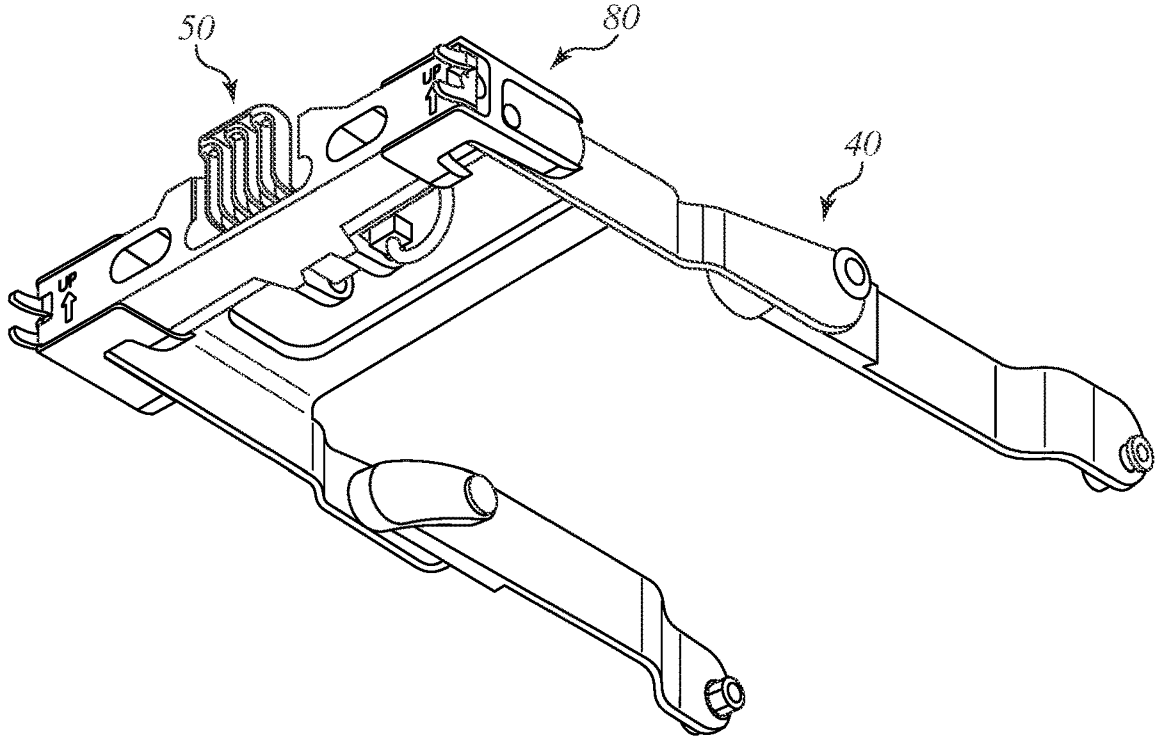
FIG. 24 is an isometric view of the bottom, front and right-side view of the foot-side linkage of the actuator lifting assembly mechanism of FIG. 23 albeit rotated and with the safety latch mechanism of FIGS. 8-13 in place.
Figure 25:
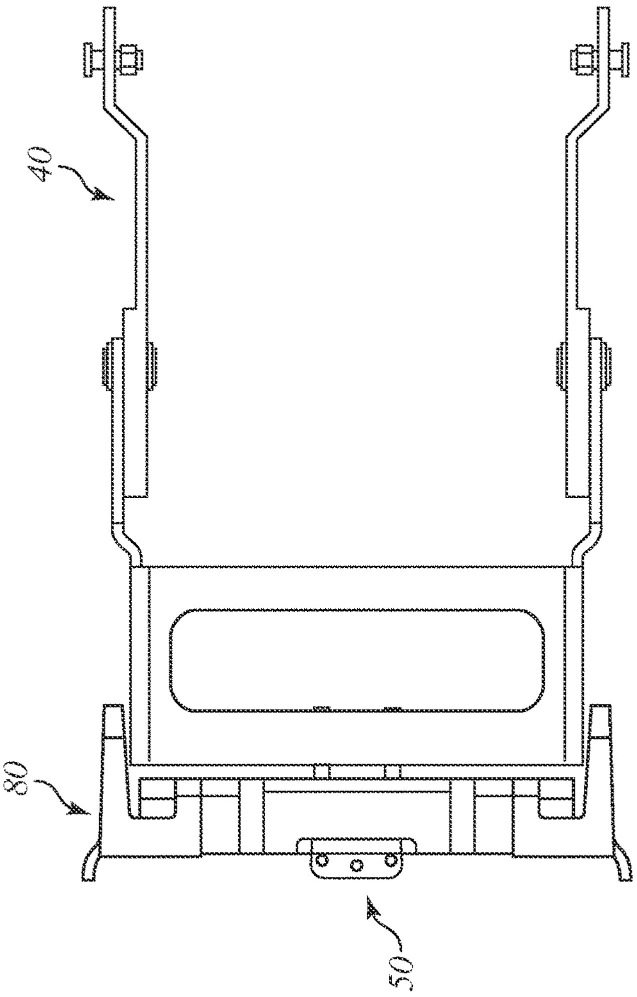
FIGS. 25-27 are respectively top, front and right-side views of the foot-side linkage of the actuator lifting assembly mechanism of FIGS. 23 and 24 and with the safety latch mechanism of FIGS. 8-13 in place. The right-side view is symmetric to the left-side view.
Figure 27:
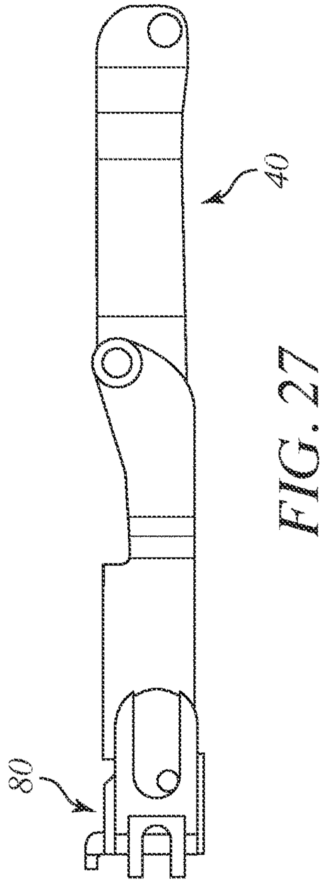
Figure 26:
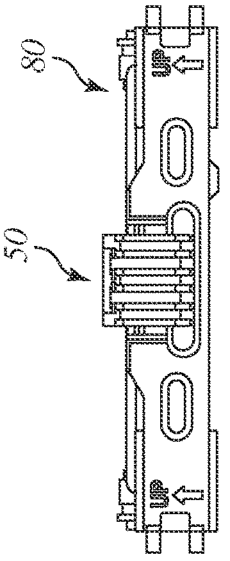

For that reason, vertical restraint may be realized by providing pairs of guides 90 for the pull bar 80 and a pair of mating locking tabs 100. That is, as the pull bar 80 (the latch interface point) enters the latching zone via the actuator lowering the articulating portions 20 (moving from FIG. 4 to FIG. 3 to FIG. 2 to FIG. 1), the pair of guides 90 of the pull bar 80 (which is what the safety latch mechanism 50 interfaces with) on each side as shown in FIGS. 6 and 7 make engagement with respective ones of mating locking tabs 100 on a pair of right-angled guide rails 110. The pull bar 80 may be slid back and forth between and upon the right-angled guide rails 110.

The engagement of the mating locking tabs 100 with respective pairs of the guides 90 keeps the pull bar 80 vertically restrained as long as the engagement remains. As the pull bar 80 is urged out of the latching zone, however, the pairs of the guides 90 and the mating locking tabs 100 disengage from each other, thereby ending the engagement and thus the actuator lifting assembly mechanism 40 is no longer vertically restrained.

If desired, the pull bar 80 may be replaced in a conventional manner by a different component that can be moved to both simultaneously cause the articulating frame 20 to pivot relative to the stationary frame 30 and disengage whatever is vertically restraining the actuator lifting assembly mechanism 40.

The safety latch mechanism 50 is depicted in FIGS. 8-13, the pull bar 80 is depicted in FIGS. 14-17, the foot-side linkage of the actuator lifting assembly mechanism 40 is depicted in FIGS. 18-22, and the foot-side linkage of the actuator lifting assembly mechanism 40 with the safety latch mechanism 50 in place is depicted in FIGS. 23-27. The foot-side linkage of the actuator lifting assembly mechanism 40 and a head-side linkage of the actuator lifting assembly mechanism 60 operate in an analogous manner with each other except that the former acts to lift the foot-side of the mattress over the foot-side of the adjustable bedframe and the latter acts to lift the head-side of the mattress over the head-side of the adjustable bedframe and thus cause respective articulating frames to pivot symmetrically relative to each other with portions of the respective frames that are the further away from each other being raised higher in the deployed state than are portions that are closer to each other.

Figure 28:
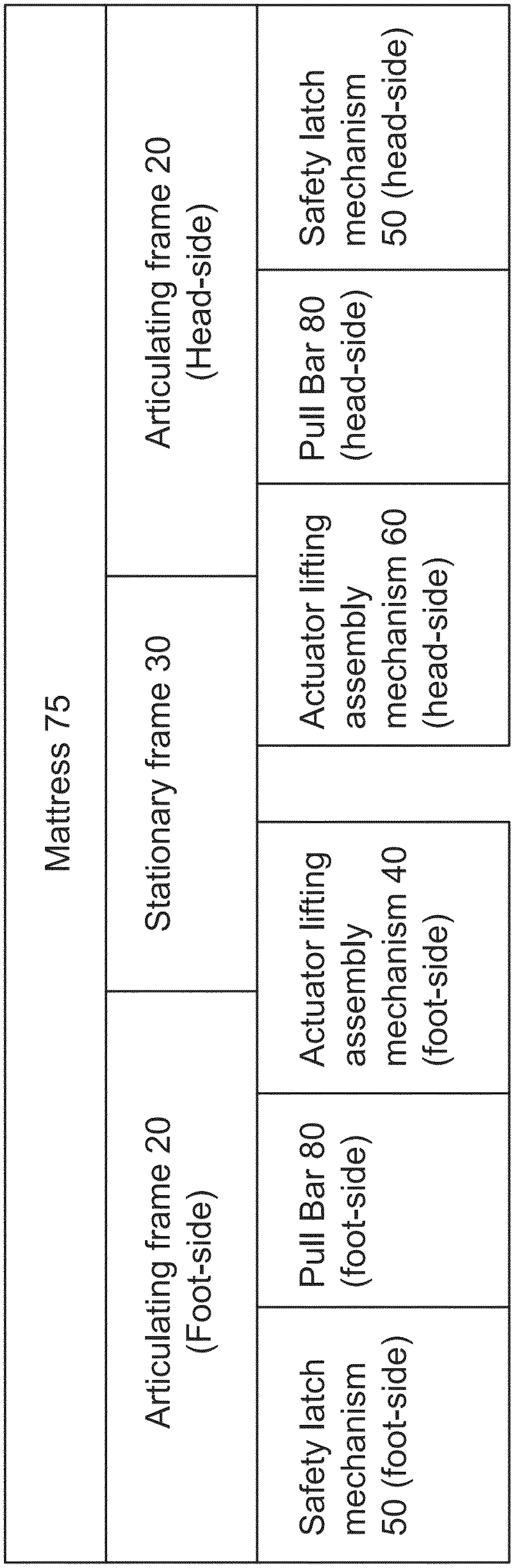
Figure 29A:
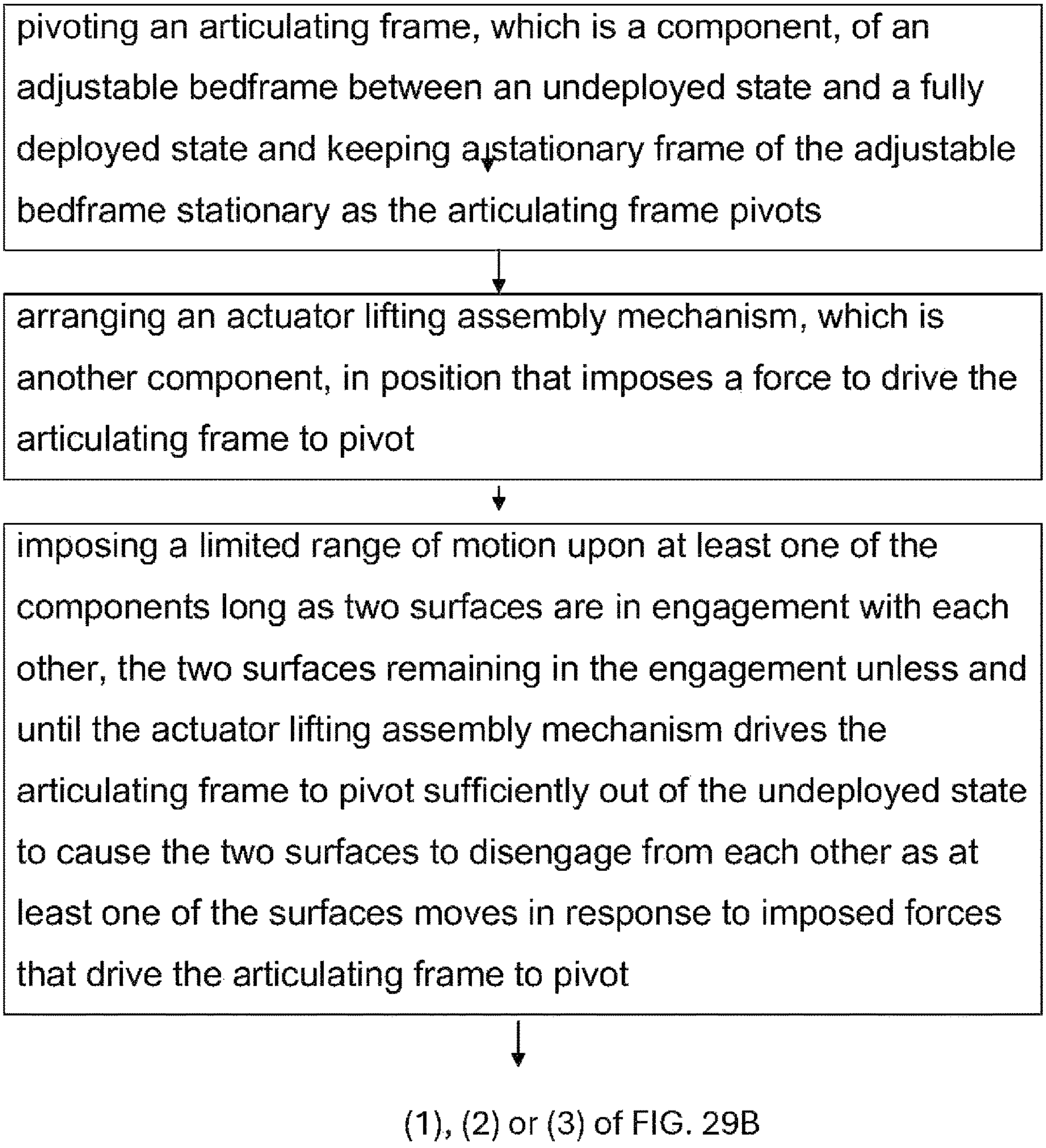

FIG. 28 illustrates the overall arrangement of the invention by showing the relation with respect to each other of the adjustable bedframe 10 that has two articulating frames 20 and a stationary frame 30, the foot-side actuator lifting assembly mechanism 40, the safety latch mechanism 50, the head-side actuator lifting assembly mechanism 60, a mattress. 75, and a pull bar 80. FIGS. 29A, 29B and 29C set forth method steps to impose a limited range of motion (LROM) upon either the actuator lifting assembly mechanism (ALAM) 40 or the adjustable frames (AF) 20 of the adjustable bedframe 10 via a safety latch mechanism (SLM) 50 and/or mating locking tabs 100.

The apparatus limits a range of motion of an adjustable lift assembly bedframe with a plurality of components that include an adjustable bedframe having a stationary frame and an articulating frame. The components also include as actuator lifting assembly mechanism arranged to impose forces that drive the articulating frame to pivot and means for preventing at least one of the components from moving beyond a limited range of motion as long as two surfaces are in engagement with each other unless and until the actuator lifting assembly drives the articulating frame to pivot sufficiently out of the undeployed state to cause two surfaces to disengage from each other. The means for preventing includes a safety latch mechanism attached to the articulating frame that engages with the actuator lifting assembly mechanism to effect restriction on the articulating frame against pivoting beyond the limited range of motion.

The articulating frame is pivotably movable between an undeployed state and a fully deployed state. The stationary frame remains stationary as the articulating frame pivots. At least one of the surfaces moves in response to forces that drive the articulating frame to pivot.

The actuator linkage pull bar of the actuator linkage lifting assembly mechanism effects back and forth movements. The safety latch mechanism has an end, which constitutes one of the two surfaces, and moves into a channel of the actuator linkage pull bar to cause engagement of the end with the actuator linkage pull bar, which has another of the two surfaces, and moves out of the channel to cause disengagement of the end with the actuator pull bar. The articulating frame is driven to pivot in response to the back and forth movements of the actuator linkage pull bar.

The means for preventing includes locking tabs arranged to restrain the actuator lifting assembly mechanism from moving beyond the limited range of motion. The locking tabs has one of the two surfaces.

While the foregoing description and drawings represent the preferred embodiments of the present invention, various changes and modifications may be made without departing from the scope of the present invention.

What is claimed is:

1. An apparatus that limits a range of motion for an adjustable bedframe, comprising:

an actuator lifting mechanism configured for driving an articulating frame of the adjustable bedframe to pivot between raised and lowered orientations; and restricting means responsive to one pair of surfaces being in contact with each other and a further pair surfaces being in contact with each other for restricting the articulating frame of the adjustable bedframe from pivoting beyond a limited range of motion and responsive to the one pair of surfaces being out of contact with each other and the further pair of surfaces being out of contact with each other for ceasing the restricting.

2. The apparatus of claim 1, wherein the restricting means is configured to carry out the restricting in response to mating locking tabs and guides with each other and to engaging a channel and an end of a safety latch with each other, the restricting means being configured to cease the restraining in response to separating the locking tabs and the guides from each other and separating the channel and the end of the safety latch from each other, wherein the locking tabs and the guides include the one pair of surfaces and the channel and the end of the safety latch include the further pair of surfaces, whereby the locking tabs and guides are in an engaged condition as the one of the pair of surfaces are in contact with each other and are in a disengaged condition as the one pair of surfaces are out of contact with each other, the safety latch being in a latched condition as the further pair of surfaces are in contact with each other and in an unlatched condition as the further pair of surfaces are out of contact with each other.

3. The apparatus of claim 1, wherein the adjustable bedframe has a stationary frame in addition to the articulating frame, the stationary frame remaining stationary as the articulating frame pivots between the raised and lowered orientations.

4. The apparatus of claim 1, wherein the actuator lifting mechanism includes an actuator linkage pull bar that carries out back and forth movements, the actuator lifting mechanism being responsive to the back and forth movements to drive the articulating frame to pivot.

5. The apparatus of claim 4, further comprising:

a pair of guide rails, the actuator linkage pull bar being arranged to slide along the pair of guide rails to cause the back and forth movements to arise;

a pair of locking tabs that respectively protrude toward each other from the pair of guide rails; and a pair of guides of the actuator linkage pull bar that are arranged to mate with the pair of the locking tabs wherein the locking tabs and the guides include the one pair of surfaces.

6. The apparatus of claim 1, further comprising:

a safety latch mechanism deployed to lock the articulating frame in a flat or nearly flat position that prevents the articulating frame from opening during any of moving/handling/repairing of the adjustable bedframe, the safety latch mechanism and a channel having the further pair of surfaces.

7. The apparatus of claim 6, further comprising:

means for moving an end of the safety latch mechanism into the channel to engage an actuator linkage pull bar of the actuator lifting mechanism and for subsequently moving the end of the safety latch mechanism out of the channel and thereby disengage from the actuator linkage pull bar.

8. A method for operating an apparatus that limits a range of motion of an adjustable bedframe, comprising:

an actuator lifting mechanism driving an articulating frame of the adjustable bedframe to pivot between raised and lowered orientations; and in response to one pair of surfaces being in contact with each other and a further pair of surfaces being in contact with each other, restricting the articulating frame of the adjustable bedframe from pivoting beyond a limited range of motion and in response to the one pair of surfaces being out of contact with each other and the further pair of surfaces being out of contact with each other, ceasing the restricting.

9. The method for operating the apparatus of claim 8, wherein the restricting is carried out in response to mating locking tabs and guides with each other and to engaging a channel and an end of a safety latch with each other and the restraining ceases in response to separating the locking tabs and the guides from each other and separating the channel and the end of the safety latch from each other, wherein the mating locking tabs and guides include the one pair of surfaces and the channel and the end of the safety latch include the further pair of surfaces, whereby the locking tabs and guides are in an engaged condition as the one of the pair of surfaces are in contact with each other and are in a disengaged condition as the one pair of surfaces are out of contact with each other, the safety latch being in a latched condition as the further pair of surfaces are in contact with each other and in an unlatched condition as the further pair of surfaces are out of contact with each other.

10. The method for operating the apparatus of claim 8, wherein the adjustable bedframe has a stationary frame in addition to the articulating frame, the stationary frame remaining stationary as the articulating frame pivots between the raised and lowered orientations.

11. The method of operating the apparatus of claim 8, wherein the actuator lifting mechanism includes an actuator linkage pull bar that carries out back and forth movements, the actuator lifting mechanism being responsive to the back and forth movements to drive the articulating frame to pivot.

12. The method of claim 11, further comprising:

sliding the actuator linkage pull bar along a pair of guide rails to cause the back and forth movements to arise;

protruding a pair of locking tabs that respectively toward each other from the pair of guide rails; and mating a pair of guides of the actuator linkage pull bar mate with the pair of locking tabs wherein the locking tabs and the guides include the one pair of surfaces.

13. The method of operation of the apparatus of claim 8, further comprising:

deploying a safety latch mechanism to lock the articulating frame in a flat or nearly flat position that prevents the articulating frame from opening during any of moving/handling/repairing of the adjustable bedframe, the safety latch mechanism and a channel having the further pair of surfaces.

14. The method of claim 13, further comprising:

moving an end of the safety latch mechanism into the channel to engage an actuator linkage pull bar of the actuation linkage mechanism and subsequently moving the end of the safety latch mechanism out of the channel and thereby disengage from the actuator linkage pull bar.

* * * * *